(12) United States Patent
Thomas et al.

(10) Patent No.: US 12,387,722 B2
(45) Date of Patent: Aug. 12, 2025

(54) MULTI-DEVICE WAKEWORD DETECTION

(71) Applicant: Dolby Laboratories Licensing Corporation, San Francisco, CA (US)

(72) Inventors: Mark R. P. Thomas, Walnut Creek, CA (US); Richard J. Cartwright, Killara (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 441 days.

(21) Appl. No.: 17/626,619

(22) PCT Filed: Jul. 29, 2020

(86) PCT No.: PCT/US2020/044114
§ 371 (c)(1),
(2) Date: Jan. 12, 2022

(87) PCT Pub. No.: WO2021/021960
PCT Pub. Date: Feb. 4, 2021

(65) Prior Publication Data
US 2022/0351724 A1   Nov. 3, 2022

Related U.S. Application Data

(60) Provisional application No. 62/964,018, filed on Jan. 21, 2020, provisional application No. 62/880,112, filed on Jul. 30, 2019.

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/08* (2013.01); *G10L 15/28* (2013.01); *G10L 2015/088* (2013.01); *G10L 2015/223* (2013.01)

(58) Field of Classification Search
None
See application file for complete search history.

(56) References Cited

U.S. PATENT DOCUMENTS 9,318,107 B1   4/2016 Sharifi
9,484,030 B1 * 11/2016 Meaney ................. H04R 3/005
(Continued)

FOREIGN PATENT DOCUMENTS

CN   106030699 A   10/2016
CN   107924681 A   4/2018
(Continued)

*Primary Examiner* — Seong-Ah A Shin

(57) ABSTRACT

A method for selecting a device for audio processing may involve receiving a first wakeword confidence metric from a first device that includes at least a first microphone and receiving a second wakeword confidence metric from a second device that includes at least a second microphone. The first and second wakeword confidence metrics may correspond to a first local maximum of a first plurality of wakeword confidence values determined by the first device and a second local maximum of a second plurality of wakeword confidence values determined by the second device. The method may involve comparing the first wakeword confidence metric and the second wakeword confidence metric and selecting a device for subsequent audio processing based, at least in part, on a comparison of the first wakeword confidence metric and the second wakeword confidence metric.

19 Claims, 7 Drawing Sheets

(51) Int. Cl.
    *G10L 15/28*     (2013.01)
    *G10L 15/32*     (2013.01)

(56) References Cited

U.S. PATENT DOCUMENTS

| | | |
|---|---|---|
| 9,734,830 B2 | 8/2017 | Lindahl |
| 9,940,949 B1 * | 4/2018 | Vitaladevuni ............ G10L 25/78 |
| 10,013,981 B2 | 7/2018 | Ramprashad |
| 10,032,451 B1 * | 7/2018 | Mamkina ................. G06F 3/167 |
| 10,043,521 B2 | 8/2018 | Bocklet |
| 10,181,323 B2 | 1/2019 | Beckhardt |
| 10,777,189 B1 * | 9/2020 | Fu ............................ G10L 15/10 |
| 11,195,522 B1 * | 12/2021 | Makashir ............ G10L 15/1815 |
| 2014/0163978 A1 | 6/2014 | Basye |
| 2016/0104480 A1 * | 4/2016 | Sharifi ..................... G10L 15/22 |
| | | 704/254 |
| 2017/0083285 A1 | 3/2017 | Meyers |
| 2017/0090864 A1 * | 3/2017 | Jorgovanovic ........ H04M 11/007 |
| 2018/0108351 A1 * | 4/2018 | Beckhardt ............... G10L 15/32 |
| 2018/0144740 A1 * | 5/2018 | Laroche .................. G10L 15/22 |
| 2018/0277113 A1 | 9/2018 | Hartung |
| 2019/0147904 A1 * | 5/2019 | Tao .......................... G10L 25/21 |
| | | 704/231 |

FOREIGN PATENT DOCUMENTS

| | | |
|---|---|---|
| CN | 108351872 A | 7/2018 |
| JP | 2017520008 A | 7/2017 |
| WO | 2014130463 A2 | 8/2014 |
| WO | 2018199390 A1 | 11/2018 |

\* cited by examiner

MULTI-DEVICE WAKEWORD DETECTION

CROSS-REFERENCE TO RELATED APPLICATIONS

This application claims priority to U.S. Provisional Patent Application No. 62/880,112 filed 30 Jul. 2019; and United States Provisional Patent Application No. 62/964,018 filed 21 Jan. 2020, which are incorporated herein by reference.

TECHNICAL FIELD

This disclosure pertains to systems and methods for automatically selecting a device, from among a plurality of devices in an environment, for audio processing.

BACKGROUND

Audio devices, including but not limited to smart audio devices, have been widely deployed and are becoming common features of many homes. Although existing systems and methods for locating audio devices provide benefits, improved systems and methods would be desirable.

NOTATION AND NOMENCLATURE

Herein, we use the expression "smart audio device" to denote a smart device which is either a single purpose audio device or a virtual assistant (e.g., a connected virtual assistant). A single purpose audio device is a device (e.g., a smart speaker, a television (TV) or a mobile phone) including or coupled to at least one microphone (and which may in some examples also include or be coupled to at least one speaker) and which is designed largely or primarily to achieve a single purpose. Although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single purpose audio device having speaker(s) and microphone(s) is often configured to run a local application and/or service to use the speaker(s) and microphone(s) directly. Some single purpose audio devices may be configured to group together to achieve playing of audio over a zone or user-configured area.

Herein, a "virtual assistant" (e.g., a connected virtual assistant) is a device (e.g., a smart speaker, a smart display or a voice assistant integrated device) including or coupled to at least one microphone (and optionally also including or coupled to at least one speaker) and which may provide an ability to utilize multiple devices (distinct from the virtual assistant) for applications that are in a sense cloud enabled or otherwise not implemented in or on the virtual assistant itself. Virtual assistants may sometimes work together, e.g., in a very discrete and conditionally defined way. For example, two or more virtual assistants may work together in the sense that one of them, i.e., the one which is most confident that it has heard a wakeword, responds to the word. Connected devices may form a sort of constellation, which may be managed by one main application which may be (or include or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (i.e., is listening for) a sound command.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a good compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed. The speaker feed may, in some instances, undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X–M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

At least some aspects of the present disclosure may be implemented via methods. Some methods may involve receiving a first wakeword confidence metric from a first device that includes at least a first microphone. The first wakeword confidence metric may, for example, correspond to a first local maximum of a first plurality of wakeword confidence values determined by the first device. Some such methods may involve receiving a second wakeword confidence metric from a second device that includes at least a second microphone. The second wakeword confidence metric may, for example, correspond to a second local maximum of a second plurality of wakeword confidence values determined by the second device. Some such methods may involve comparing the first wakeword confidence metric and the second wakeword confidence metric and selecting a device for subsequent audio processing based, at least in part, on a comparison of the first wakeword confidence metric and the second wakeword confidence metric.

In some examples, a method may involve receiving a third wakeword confidence metric from a third device that includes at least a third microphone. The third wakeword confidence metric may correspond to a third local maximum of a third plurality of wakeword confidence values determined by the third device. A method may involve comparing the third wakeword confidence metric with the first wakeword confidence metric and the second wakeword confidence metric and selecting a device for subsequent audio processing based, at least in part, on a comparison of the first wakeword confidence metric, the second wakeword confidence metric and the third wakeword confidence metric.

According to some implementations, the subsequent audio processing may involve a speech recognition process. In some examples, the subsequent audio processing may involve a command recognition process. Some such methods also may involve controlling a selected device according to the command recognition process.

In some examples, a local maximum may be determined subsequent to determining that a wakeword confidence value exceeds a wakeword detection start threshold. In some such examples, a local maximum may be determined by detecting a decrease in a wakeword confidence value after a previous wakeword confidence value has exceeded the wakeword detection start threshold. According to some such implementations, a local maximum may be determined by detecting, after a previous wakeword confidence value has exceeded the wakeword detection start threshold, a decrease in a wakeword confidence value of audio frame n as compared to a wakeword confidence value of audio frame n–k, wherein k is an integer. Some such examples may involve initiating a local maximum determination time interval after a wakeword confidence value of the first device, the second device or another device exceeds, with a rising edge, the wakeword detection start threshold. Some such examples may involve terminating the local maximum determination time interval after a wakeword confidence value of the first device, the second device or another device falls below a wakeword detection end threshold.

In some instances, the first device may sample audio data received by the first microphone according to a first clock domain. In some such examples, the second device may sample audio data received by the second microphone according to a second clock domain that is different from the first clock domain.

According to some implementations, the method may be performed by a device that is configured to perform, at least in part, the subsequent audio processing. Alternatively, or additionally, the method may be performed by a device that is configured to determine a wakeword confidence metric corresponding to a local maximum of a plurality of wakeword confidence values. However, in some instances the method may be performed, at least in part, by a device that is not configured to perform the subsequent audio processing.

At least some aspects of the present disclosure may be implemented via alternative methods. Some alternative methods may involve determining, by a first device that includes a first microphone system having at least a first microphone, a first wakeword confidence metric. Determining the first wakeword confidence metric may involve producing, via the first microphone system, first audio data corresponding to detected sound and determining, based on the first audio data, a first plurality of wakeword confidence values. Determining the first wakeword confidence metric may involve determining a first local maximum of the first plurality of wakeword confidence values and determining the first wakeword confidence metric based on the first local maximum.

Some such methods may involve receiving a second wakeword confidence metric from a second device that includes at least a second microphone. The second wakeword confidence metric may correspond to a second local maximum of a second plurality of wakeword confidence values determined by the second device. Some such methods may involve comparing the first wakeword confidence metric and the second wakeword confidence metric and selecting a device for subsequent audio processing based, at least in part, on a comparison of the first wakeword confidence metric and the second wakeword confidence metric.

In some examples, a local maximum may be determined subsequent to determining that a wakeword confidence value exceeds a wakeword detection start threshold. In some instances, a local maximum may be determined by detecting a decrease in a wakeword confidence value after a previous wakeword confidence value has exceeded the wakeword detection start threshold. According to some implementations, a local maximum may be determined by detecting, after a previous wakeword confidence value has exceeded the wakeword detection start threshold, a decrease in a wakeword confidence value of audio frame n as compared to a wakeword confidence value of audio frame n–k, wherein k is an integer.

Some such implementations also may involve initiating a local maximum determination time interval after a wakeword confidence value of the first device, the second device or another device exceeds, with a rising edge, the wakeword detection start threshold. According to some examples, the local maximum determination time interval may initiate at time A and may terminate at a time (A+K), a time at which wakeword confidence values of the first device and the second device fall below a wakeword detection end threshold. In some examples, the wakeword detection end threshold may be less than or equal to the wakeword detection start threshold. In some implementations, the wakeword detection end threshold may be less than or equal to the wakeword detection start threshold. Some such examples may involve terminating the local maximum determination time interval after a maximum value of K has been reached.

In some examples, the method may be performed by a device that is configured to perform, at least in part, the subsequent audio processing. According to some implementations, the method may be performed by the first device.

Some implementations may involve receiving the first wakeword confidence metric from the first device. In some such implementations, the method may be performed by a device that is not configured to determine a wakeword confidence metric corresponding to a local maximum of a plurality of wakeword confidence values.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method that involves receiving a first wakeword confidence metric from a first device that includes at least a first microphone. The first wakeword confidence metric may, for example, correspond to a first local maximum of a first plurality of wakeword confidence values determined by the first device. Some such methods may involve receiving a second wakeword confidence metric from a second device that includes at least a second microphone. The second wakeword confidence metric may, for example, correspond to a second local maximum of a second plurality of wakeword confidence values determined by the second device. Some such methods may involve comparing the first wakeword confidence metric and the second wakeword confidence metric and selecting a device for subsequent audio processing based, at least in part, on a comparison of the first wakeword confidence metric and the second wakeword confidence metric.

In some examples, a method may involve receiving a third wakeword confidence metric from a third device that includes at least a third microphone. The third wakeword confidence metric may correspond to a third local maximum of a third plurality of wakeword confidence values determined by the third device. A method may involve comparing the third wakeword confidence metric with the first wakeword confidence metric and the second wakeword confidence metric and selecting a device for subsequent audio processing based, at least in part, on a comparison of the first wakeword confidence metric, the second wakeword confidence metric and the third wakeword confidence metric.

According to some implementations, the subsequent audio processing may involve a speech recognition process. In some examples, the subsequent audio processing may involve a command recognition process. Some such methods also may involve controlling a selected device according to the command recognition process.

In some examples, a local maximum may be determined subsequent to determining that a wakeword confidence value exceeds a wakeword detection start threshold. In some such examples, a local maximum may be determined by detecting a decrease in a wakeword confidence value after a previous wakeword confidence value has exceeded the wakeword detection start threshold. According to some such implementations, a local maximum may be determined by detecting, after a previous wakeword confidence value has exceeded the wakeword detection start threshold, a decrease in a wakeword confidence value of audio frame n as compared to a wakeword confidence value of audio frame n−k, wherein k is an integer. Some such examples may involve initiating a local maximum determination time interval after a wakeword confidence value of the first device, the second device or another device exceeds, with a rising edge, the wakeword detection start threshold. Some such examples may involve terminating the local maximum determination time interval after a wakeword confidence value of the first device, the second device or another device falls below a wakeword detection end threshold.

In some instances, the first device may sample audio data received by the first microphone according to a first clock domain. In some such examples, the second device may sample audio data received by the second microphone according to a second clock domain that is different from the first clock domain.

According to some implementations, the method may be performed by a device that is configured to perform, at least in part, the subsequent audio processing. Alternatively, or additionally, the method may be performed by a device that is configured to determine a wakeword confidence metric corresponding to a local maximum of a plurality of wakeword confidence values. However, in some instances the method may be performed, at least in part, by a device that is not configured to perform the subsequent audio processing.

At least some aspects of the present disclosure may be implemented via alternative methods. Some alternative methods may involve determining, by a first device that includes a first microphone system having at least a first microphone, a first wakeword confidence metric. Determining the first wakeword confidence metric may involve producing, via the first microphone system, first audio data corresponding to detected sound and determining, based on the first audio data, a first plurality of wakeword confidence values. Determining the first wakeword confidence metric may involve determining a first local maximum of the first plurality of wakeword confidence values and determining the first wakeword confidence metric based on the first local maximum.

Some such methods may involve receiving a second wakeword confidence metric from a second device that includes at least a second microphone. The second wakeword confidence metric may correspond to a second local maximum of a second plurality of wakeword confidence values determined by the second device. Some such methods may involve comparing the first wakeword confidence metric and the second wakeword confidence metric and selecting a device for subsequent audio processing based, at least in part, on a comparison of the first wakeword confidence metric and the second wakeword confidence metric.

In some examples, a local maximum may be determined subsequent to determining that a wakeword confidence value exceeds a wakeword detection start threshold. In some instances, a local maximum may be determined by detecting a decrease in a wakeword confidence value after a previous wakeword confidence value has exceeded the wakeword detection start threshold. According to some implementations, a local maximum may be determined by detecting, after a previous wakeword confidence value has exceeded the wakeword detection start threshold, a decrease in a wakeword confidence value of audio frame n as compared to a wakeword confidence value of audio frame n−k, wherein k is an integer.

Some such implementations also may involve initiating a local maximum determination time interval after a wakeword confidence value of the first device, the second device or another device exceeds, with a rising edge, the wakeword detection start threshold. According to some examples, the local maximum determination time interval may initiate at time A and may terminate at a time (A+K), a time at which wakeword confidence values of the first device and the second device fall below a wakeword detection end threshold. In some examples, the wakeword detection end threshold may be less than or equal to the wakeword detection start threshold. In some implementations, the wakeword detection end threshold may be less than or equal to the wakeword detection start threshold. Some such examples may involve terminating the local maximum determination time interval after a maximum value of K has been reached.

In some examples, the method may be performed by a device that is configured to perform, at least in part, the subsequent audio processing. According to some implementations, the method may be performed by the first device.

Some implementations may involve receiving the first wakeword confidence metric from the first device. In some such implementations, the method may be performed by a device that is not configured to determine a wakeword confidence metric corresponding to a local maximum of a plurality of wakeword confidence values.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured for receiving a first wakeword confidence metric from a first device that includes at least a first microphone. The first wakeword confidence metric may, for example, correspond to a first local maximum of a first plurality of wakeword confidence values determined by the first device. The control system may be configured for receiving a second wakeword confidence metric from a second device that includes at least a second microphone. The second wakeword confidence metric may, for example, correspond to a second local maximum of a second plurality of wakeword confidence values determined by the second device. The control system may be configured for comparing the first wakeword confidence metric and the second wakeword confidence metric and selecting a device for subsequent audio processing based, at least in part, on a comparison of the first wakeword confidence metric and the second wakeword confidence metric.

In some examples, the control system may be configured for receiving a third wakeword confidence metric from a third device that includes at least a third microphone. The third wakeword confidence metric may correspond to a third local maximum of a third plurality of wakeword confidence values determined by the third device. The control system may be configured for comparing the third wakeword confidence metric with the first wakeword confidence metric and the second wakeword confidence metric and selecting a device for subsequent audio processing based, at least in part, on a comparison of the first wakeword confidence metric, the second wakeword confidence metric and the third wakeword confidence metric.

According to some implementations, the subsequent audio processing may involve a speech recognition process. In some examples, the subsequent audio processing may involve a command recognition process. In some implementations, the control system may be configured for controlling a selected device according to the command recognition process.

In some examples, a local maximum may be determined subsequent to determining that a wakeword confidence value exceeds a wakeword detection start threshold. In some such examples, a local maximum may be determined by detecting a decrease in a wakeword confidence value after a previous wakeword confidence value has exceeded the wakeword detection start threshold. According to some such implementations, a local maximum may be determined by detecting, after a previous wakeword confidence value has exceeded the wakeword detection start threshold, a decrease in a wakeword confidence value of audio frame n as compared to a wakeword confidence value of audio frame n–k, wherein k is an integer. Some such examples may involve initiating a local maximum determination time interval after a wakeword confidence value of the first device, the second device or another device exceeds, with a rising edge, the wakeword detection start threshold. Some such examples may involve terminating the local maximum determination time interval after a wakeword confidence value of the first device, the second device or another device falls below a wakeword detection end threshold.

In some instances, the first device may sample audio data received by the first microphone according to a first clock domain. In some such examples, the second device may sample audio data received by the second microphone according to a second clock domain that is different from the first clock domain.

According to some implementations, the control system functionality may be performed by a device that is configured to perform, at least in part, the subsequent audio processing. Alternatively, or additionally, the control system functionality may be performed by a device that is configured to determine a wakeword confidence metric corresponding to a local maximum of a plurality of wakeword confidence values. However, in some instances the control system functionality may be performed, at least in part, by a device that is not configured to perform the subsequent audio processing.

At least some aspects of the present disclosure may be implemented via alternative devices. A control system of some alternative apparatus may be configured for determining, by a first device that includes a first microphone system having at least a first microphone, a first wakeword confidence metric. Determining the first wakeword confidence metric may involve producing, via the first microphone system, first audio data corresponding to detected sound and determining, based on the first audio data, a first plurality of wakeword confidence values. Determining the first wakeword confidence metric may involve determining a first local maximum of the first plurality of wakeword confidence values and determining the first wakeword confidence metric based on the first local maximum.

The control system may be configured for receiving a second wakeword confidence metric from a second device that includes at least a second microphone. The second wakeword confidence metric may correspond to a second local maximum of a second plurality of wakeword confidence values determined by the second device. The control system may be configured for comparing the first wakeword confidence metric and the second wakeword confidence metric and selecting a device for subsequent audio processing based, at least in part, on a comparison of the first wakeword confidence metric and the second wakeword confidence metric.

In some examples, a local maximum may be determined subsequent to determining that a wakeword confidence value exceeds a wakeword detection start threshold. In some instances, a local maximum may be determined by detecting a decrease in a wakeword confidence value after a previous wakeword confidence value has exceeded the wakeword detection start threshold. According to some implementations, a local maximum may be determined by detecting, after a previous wakeword confidence value has exceeded the wakeword detection start threshold, a decrease in a wakeword confidence value of audio frame n as compared to a wakeword confidence value of audio frame n–k, wherein k is an integer.

Some such implementations also may involve initiating a local maximum determination time interval after a wakeword confidence value of the first device, the second device or another device exceeds, with a rising edge, the wakeword detection start threshold. According to some examples, the local maximum determination time interval may initiate at time A and may terminate at a time (A+K), a time at which wakeword confidence values of the first device and the second device fall below a wakeword detection end threshold. In some examples, the wakeword detection end threshold may be less than or equal to the wakeword detection start threshold. In some implementations, the wakeword detection end threshold may be less than or equal to the wakeword detection start threshold. Some such examples may involve terminating the local maximum determination time interval after a maximum value of K has been reached.

In some examples, at least some of the foregoing operations may be performed by a device that is configured to perform, at least in part, the subsequent audio processing. According to some implementations, such operations may be performed by the first device.

Some implementations may involve receiving the first wakeword confidence metric from the first device. In some such implementations, some operations may be performed by a device that is not configured to determine a wakeword confidence metric corresponding to a local maximum of a plurality of wakeword confidence values.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

An orchestrated system consisting of multiple smart audio devices may be configured to determine when a "wakeword" (defined above) from a user is detected. At least some devices of such a system may be configured to listen for a command from the user.

Figure 1A:
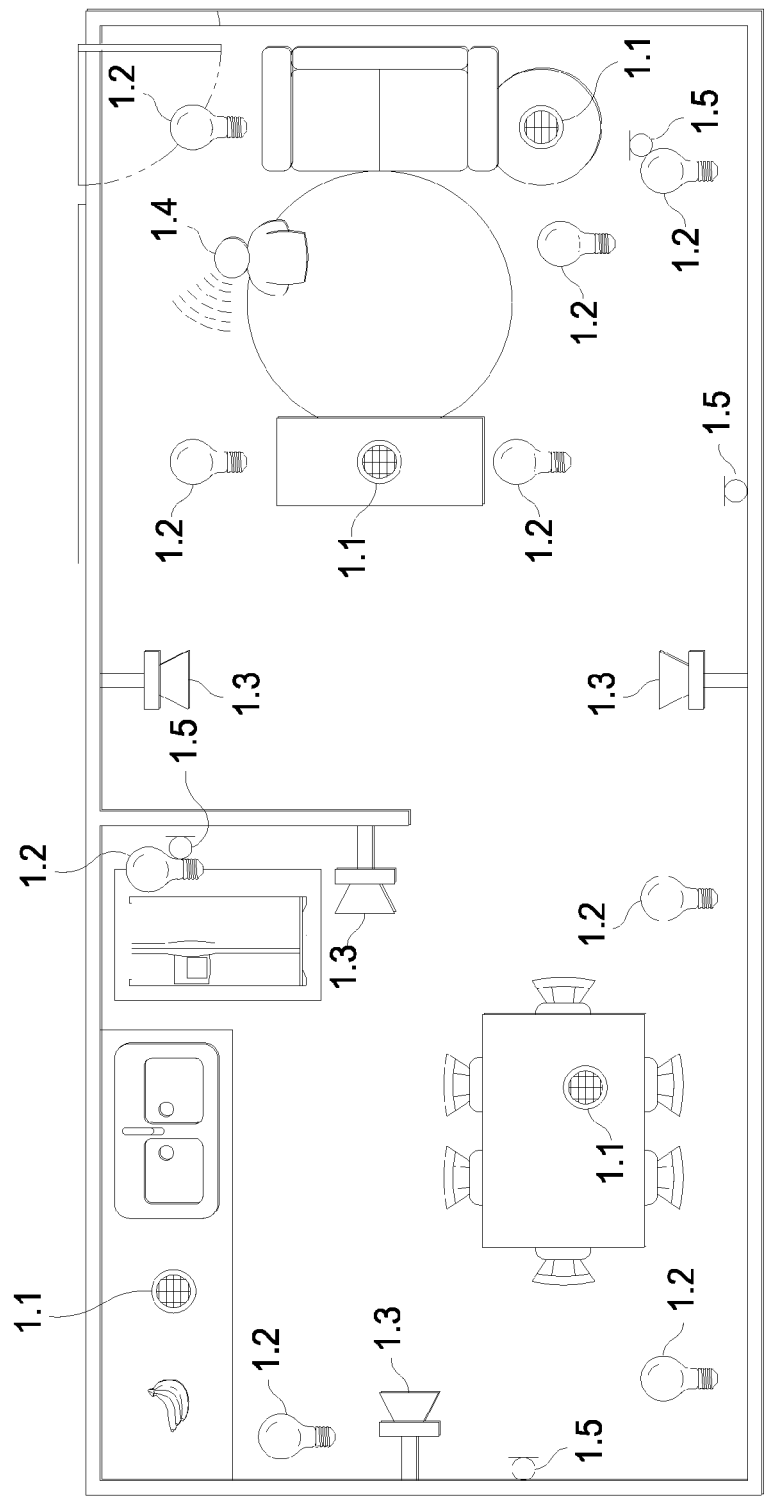
FIG. 1A represents an environment according to one example.

FIG. 1A is a diagram of an environment (a living space) which includes a system including a set of smart audio devices (devices 1.1) for audio interaction, speakers (1.3) for audio output, microphones 1.5 and controllable lights (1.2). As with the other figures of this application, the particular elements and the arrangement of the elements that are shown in FIG. 1A are merely made by way of example. Not all of these features may be needed to perform various disclosed implementations. For example, the controllable lights 1.2, speakers 1.3, etc. are optional for at least some disclosed implementations. In some instances, one or more of the microphones 1.5 may be part of, or associated with one of the devices 1.1, the lights 1.2 or the speakers 1.3. Alternatively, or additionally, one or more of the microphones 1.5 may be attached to another part of the environment, e.g., to a wall, to a ceiling, to furniture, to an appliance or to another device of the environment. In an example, each of the smart audio devices 1.1 includes (and/or is configured for communication with) at least one microphone 1.5. The system of FIG. 1A may be configured to implement an embodiment of the present disclosure. Using various methods, information may be obtained collectively from the microphones 1.5 of FIG. 1A and provided to a device configured to provide a positional estimate of a user who speaks a wakeword.

In a living space (e.g., that of FIG. 1A), there are a set of natural activity zones where a person would be performing a task or activity, or crossing a threshold. These areas, which may be referred to herein as user zones, may be defined by a user, in some examples, without specifying coordinates or other indicia of a geometric location. In the example shown in FIG. 1A, user zones may include:
  1. The kitchen sink and food preparation area (in the upper left region of the living space);
  2. The refrigerator door (to the right of the sink and food preparation area);
  3. The dining area (in the lower left region of the living space);
  4. The open area of the living space (to the right of the sink and food preparation area and dining area);
  5. The TV couch (at the right of the open area);
  6. The TV itself;
  7. Tables; and
  8. The door area or entry way (in the upper right region of the living space).

In accordance with some embodiments, a system that estimates where a sound (e.g., a wakeword or other signal for attention) arises or originates may have some determined confidence in (or multiple hypotheses for) the estimate. For example, if a user happens to be near a boundary between zones of the system's environment, an uncertain estimate of location of the user may include a determined confidence that the user is in each of the zones. In some conventional implementations of a voice interface it may be required that the voice assistant's voice is only issued from one location at a time, this forcing a single choice for the single location (e.g., one of the eight speaker locations, 1.1 and 1.3, in FIG. 1A). However, based on simple imaginary role play, it is apparent that (in such conventional implementations) the likelihood of the selected location of the source of the assistant's voice (e.g., the location of a speaker included in or configured for communication with the assistant) being the focus point or natural return response for expressing attention may be low.

Figure 1B:
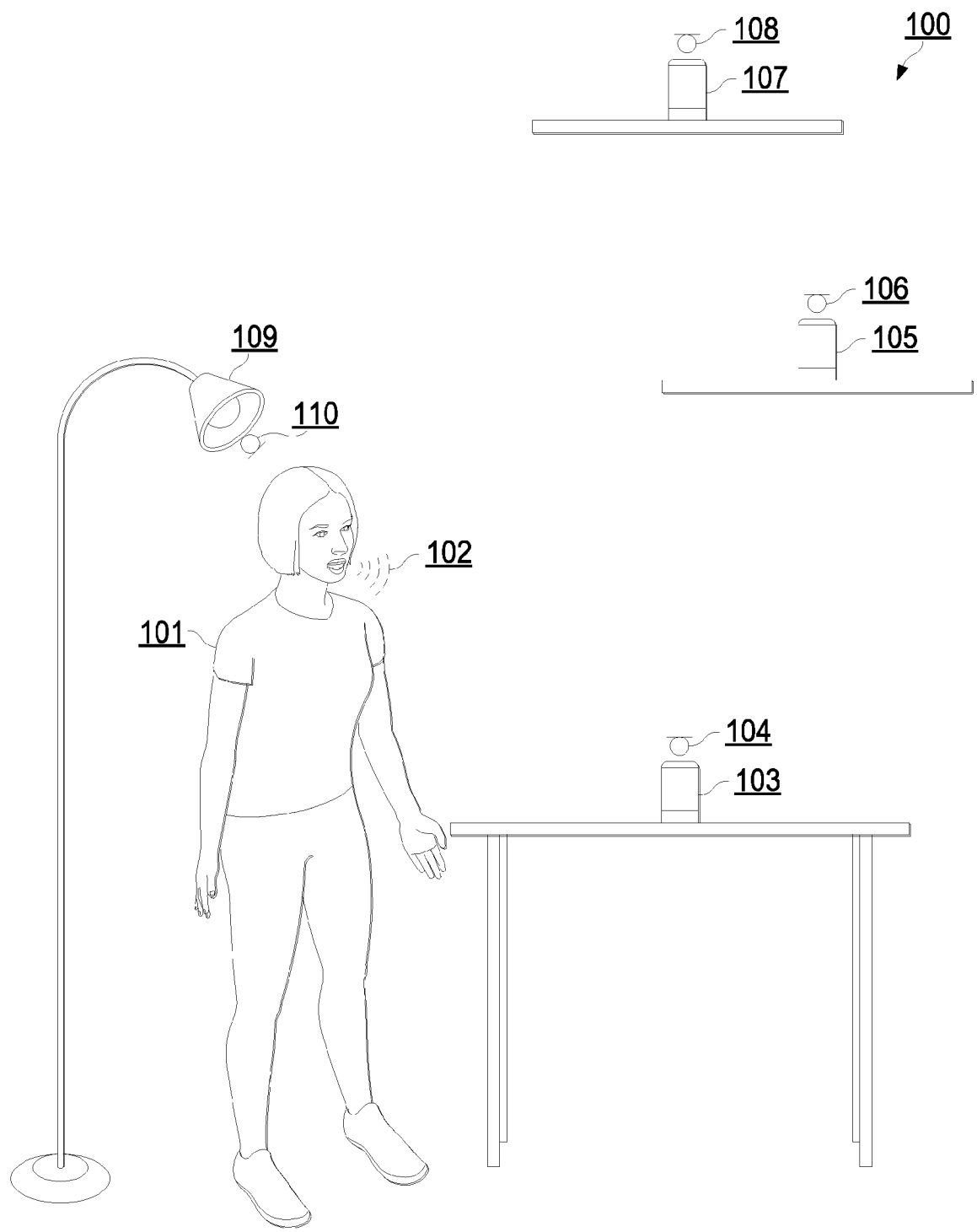
FIG. 1B represents an environment according to another example.

Next, with reference to FIG. 1B, we describe another environment 100 (an acoustic space) which includes a user (101) who utters direct speech 102, and an example of a system including a set of smart audio devices (103, 105 and 107), speakers for audio output, and microphones. The system may be configured in accordance with an embodiment of the present disclosure. The speech uttered by user 101 (sometimes referred to herein as a talker) may be recognized by element(s) of the system as a wakeword.

More specifically, elements of the FIG. 1B system include:

- 102: direct local voice (produced by the user 101);
- 103: voice assistant device (coupled to one or more loudspeakers). Device 103 is positioned nearer to the user 101 than is device 105 or device 107, and thus device 103 is sometimes referred to as a "near" device, device 105 may be referred to as a "mid-distance" device and device 107 may be referred to as a "distant" device;
- 104: plurality of microphones in (or coupled to) the near device 103;
- 105: mid-distance voice assistant device (coupled to one or more loudspeakers);
- 106: plurality of microphones in (or coupled to) the mid-distance device 105;
- 107: distant voice assistant device (coupled to one or more loudspeakers);
- 108: plurality of microphones in (or coupled to) the distant device 107;
- 109: Household appliance (e.g. a lamp); and
- 110: Plurality of microphones in (or coupled to) household appliance 109. In some examples, each of the microphones 110 may be configured for communication with a device configured for implementing one or more of the disclosed methods, which may in some instances be at least one of devices 103, 105 or 107.

As talker 101 utters sound 102 indicative of a wakeword in the acoustic space, the sound is received by nearby device 103, mid-distance device 105, and far device 107. In this example, each of devices 103, 105, and 107 is (or includes) a wakeword detector, and each of devices 103, 105, and 107 is configured to determine when wakeword likelihood (probability that a wakeword has been detected by the device) exceeds a predefined threshold. As time progresses, the wakeword likelihood determined by each device can be graphed as a function of time.

Figure 2:
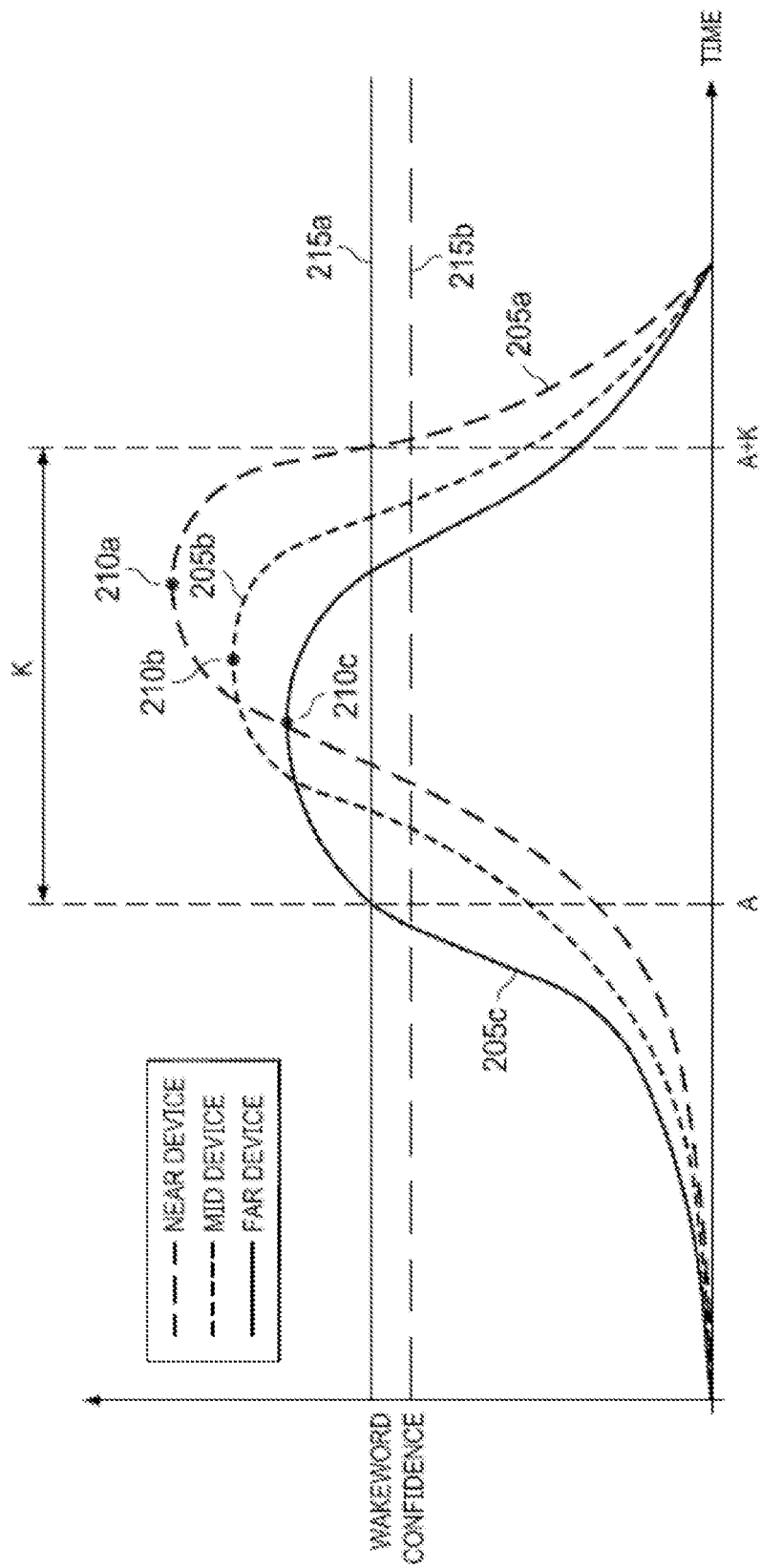
FIG. 2 shows examples of wakeword confidence value curves determined by three devices.

FIG. 2 shows examples of wakeword confidence value curves determined by three devices. The dotted curve 205*a* shown in FIG. 2 indicates wakeword likelihood as a function of time, as determined by near device 103. The dashed curve 205*b* indicates wakeword likelihood as a function of time, as determined by mid-distance device 105. The solid curve 205*c* indicates wakeword likelihood as a function of time, as determined by far device 107.

As is apparent from inspection of FIG. 2, as time progresses, the wakeword likelihood determined by each of devices 103, 105, and 107 increases and then decreases (e.g., as it passes into and out of a history buffer of the relevant one of the devices). In some cases, the wakeword confidence of the far device (the solid curve in FIG. 2) might exceed the threshold before the wakeword confidence of the mid-distance device (the dotted curve of FIG. 2), which too might exceed the threshold before the wakeword confidence of the near device (the dashed curve of FIG. 2) does. By the time the near device's wakeword confidence reaches its local maximum (e.g., the greatest maximum value of the relevant curve of FIG. 2), this event is usually ignored (by conventional approaches) in favor of selecting the device (the far device, in the FIG. 2 example) whose wakeword confidence (wakeword likelihood) first exceeds the threshold.

Returning to FIG. 1B, the system may include at least one device that is configured for implementing one or more methods of selecting a device for audio processing that are disclosed herein. For example, device 103, device 105 and/or device 107 may be configured for implementing one or more such methods. Alternatively, or additionally, another device that is configured for communication with device 103, device 105 and/or device 107 may be configured for implementing one or more such methods. In some examples, one or more disclosed methods may be implemented by another local device (e.g., a device within the environment 100), whereas in other examples one or more disclosed methods may be implemented by a remote device that is located outside of the environment 100 (e.g., a server).

Figure 3:
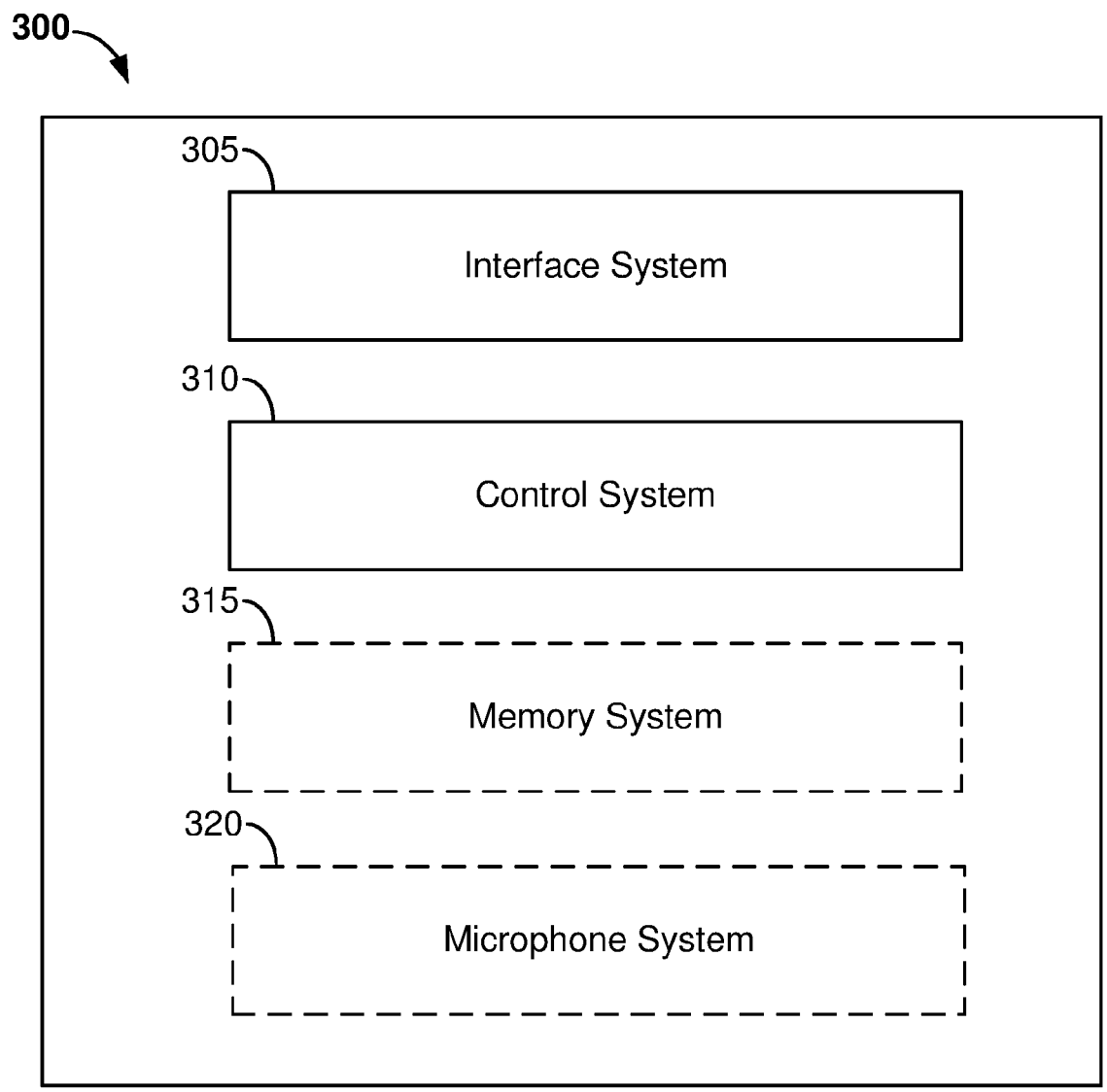
FIG. 3 is a block diagram that shows examples of components of an apparatus capable of implementing various aspects of this disclosure.

FIG. 3 is a block diagram that shows examples of components of an apparatus capable of implementing various aspects of this disclosure. According to some examples, the apparatus 300 may be, or may include, a smart audio device that is configured for performing at least some of the methods disclosed herein. In other implementations, the apparatus 300 may be, or may include, another device that is configured for performing at least some of the methods disclosed herein. In some such implementations the apparatus 300 may be, or may include, a server.

In this example, the apparatus 300 includes an interface system 305 and a control system 310. The interface system 305 may, in some implementations, be configured for receiving input from each of a plurality of microphones in an environment. The interface system 305 may include one or more network interfaces and/or one or more external device interfaces (such as one or more universal serial bus (USB) interfaces). According to some implementations, the interface system 305 may include one or more wireless interfaces. The interface system 305 may include one or more devices for implementing a user interface, such as one or more microphones, one or more speakers, a display system, a touch sensor system and/or a gesture sensor system. In some examples, the interface system 305 may include one or more interfaces between the control system 310 and a memory system, such as the optional memory system 315 shown in FIG. 3. However, the control system 310 may include a memory system.

The control system 310 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 310 may reside in more than one device. For example, a portion of the control system 310 may reside in a device within one of the environments depicted in FIGS. 1A and 1B, and another portion of the control system 310 may reside in a device that is outside the environment, such as a server, a mobile device (e.g., a smartphone or a tablet computer), etc. The interface system 305 also may, in some such examples, reside in more than one device.

In some implementations, the control system 310 may be configured for performing, at least in part, the methods disclosed herein. According to some examples, the control system 310 may be configured for implementing methods of selecting a device for audio processing, e.g., such as those disclosed herein. In some such examples, the control system 310 may be configured for selecting, based at least in part on a comparison of a plurality of wakeword confidence metrics, a device for audio processing.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 315 shown in FIG. 3 and/or in the control system 310. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 310 of FIG. 3.

In some examples, the apparatus 300 may include the optional microphone system shown in FIG. 3. The optional microphone system may include one or more microphones. According to some such examples the apparatus 300 may be, or may include, a smart audio device. In some such implementations the apparatus 300 may be, or may include, a wakeword detector. For example, the apparatus 300 may be, or may include, a virtual assistant.

Figure 4:
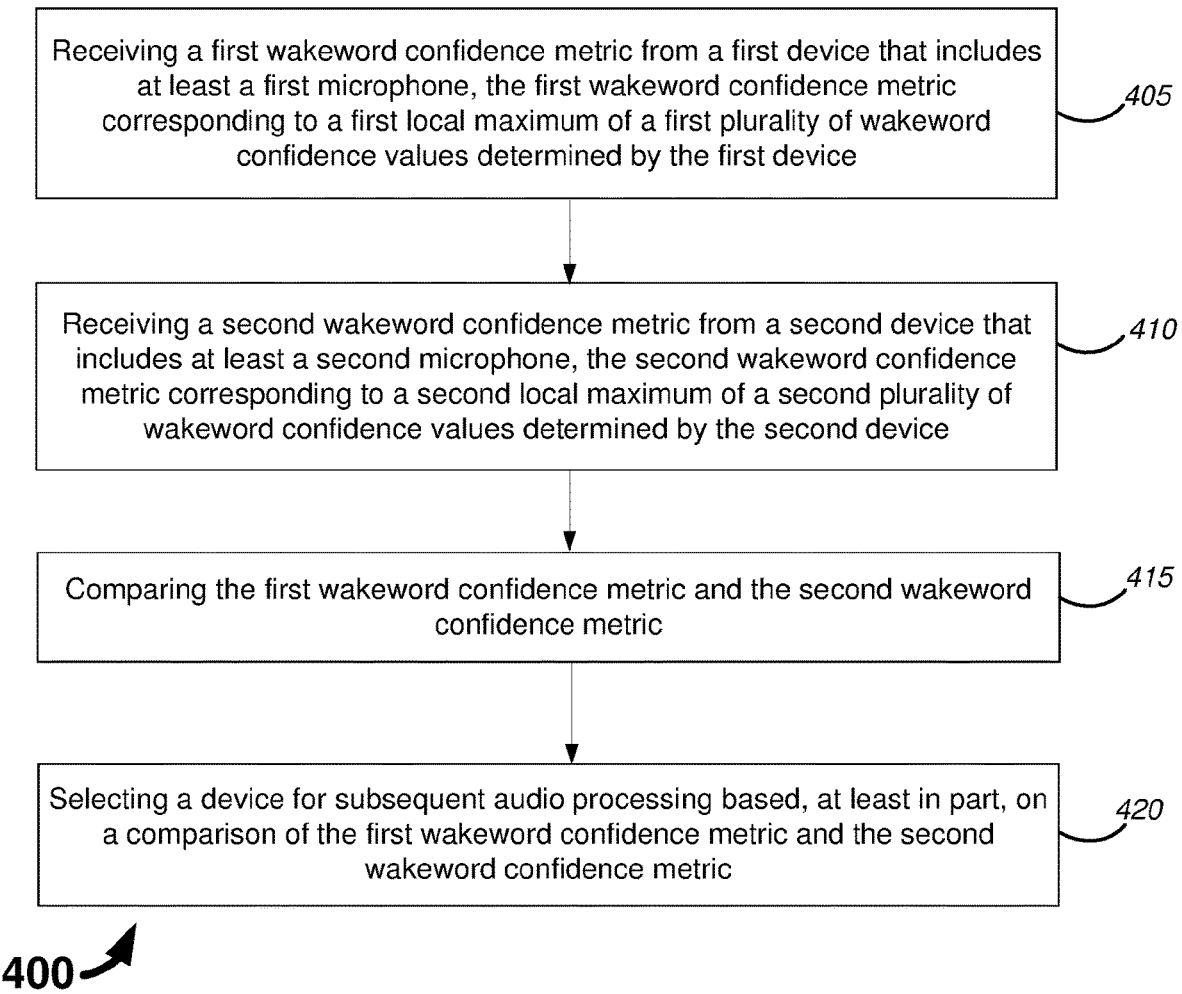
FIG. 4 is a flow diagram that outlines one example of a method that may be performed by an apparatus such as that shown in FIG. 3.

FIG. 4 is a flow diagram that outlines one example of a method that may be performed by an apparatus such as that shown in FIG. 3. The blocks of method 400, like other methods described herein, are not necessarily performed in the order indicated. Moreover, such methods may include more or fewer blocks than shown and/or described. In this implementation, method 400 involves selecting a device for audio processing. According to some examples, method 400 may be performed by a device that is configured to perform the audio processing. However, in some examples method 400 may be performed by a device that is not configured to perform the audio processing.

In this example, block 405 involves receiving a first wakeword confidence metric from a first device that includes at least a first microphone. According to this example, the first wakeword confidence metric corresponds to a first local maximum of a first plurality of wakeword confidence values determined by the first device.

In this implementation, block 410 involves receiving a second wakeword confidence metric from a second device that includes at least a second microphone. According to this example, the second wakeword confidence metric corresponds to a second local maximum of a second plurality of wakeword confidence values determined by the second device. In this example, the first device and the second device are in the same environment, which may be an environment like that shown in FIG. 1A or FIG. 1B.

However, the first microphone and the second microphone may or may not be synchronous microphones, based on the particular implementation. As used herein, microphones may be referred to as "synchronous" if the sounds detected by the microphones are digitally sampled using the same sample clock, or synchronized sample clocks. For example, a first microphone of a plurality of microphones within the environment may sample audio data according to a first sample clock and a second microphone of the plurality of microphones may sample audio data according to the first sample clock.

According to some alternative implementations, at least some microphones, or microphone systems, of an environment may be "asynchronous." As used herein, microphones may be referred to as "asynchronous" if the sounds detected by the microphones are digitally sampled using distinct sample clocks. For example, a first microphone of a plurality of microphones within the environment may sample audio data according to a first sample clock and a second microphone of the plurality of microphones may sample audio data according to a second sample clock. In some instances, the microphones in an environment may be randomly located, or at least may be distributed within the environment in an irregular and/or asymmetric manner.

Referring again to FIG. 2, the curve 205*a* provides an example of a first plurality of wakeword confidence values determined by the first device and the curve 205*b* provides an example of a second plurality of wakeword confidence values determined by the second device. The local maximum 210*a* provides an example of a first local maximum of a first plurality of wakeword confidence values determined by the first device and the local maximum 210*b* provides an example of a second local maximum of a second plurality of wakeword confidence values determined by the second device. In some examples, the local maximum 210*a* may correspond to the first wakeword confidence metric and the local maximum 210*b* may correspond to the second wakeword confidence metric.

According to the example shown in FIG. 4, block 415 involves comparing the first wakeword confidence metric and the second wakeword confidence metric. In this example, block 420 involves selecting a device for subsequent audio processing based, at least in part, on a comparison of the first wakeword confidence metric and the second wakeword confidence metric. For example, block 420 may involve selecting the device that determined the higher wakeword confidence metric.

According to some implementations, the subsequent audio processing may be, or may include, a speech recognition process. For example, the subsequent audio processing may be, or may include, a command recognition process. In some instances, method 400 may involve controlling a selected device according to the command recognition process. For example, method 400 may involve controlling a virtual assistant according to the command recognition process. In some such examples, method 400 may involve controlling the virtual assistant to initiate a telephone call, controlling the virtual assistant to perform an Internet search, controlling the virtual assistant to provide instructions to another device, such as a television, a sound system controller or another device in the environment.

In some examples, method 400 may involve receiving wakeword confidence metrics from more than two devices in an environment. Some such examples may involve receiving a third wakeword confidence metric from a third device that includes at least a third microphone. The third wakeword confidence metric may correspond to a third local maximum of a third plurality of wakeword confidence values determined by the third device. In some such examples, method 400 may involve comparing the third wakeword confidence metric with the first wakeword confidence metric and the second wakeword confidence metric and selecting a device for subsequent audio processing based, at least in part, on a comparison of the first wakeword confidence metric, the second wakeword confidence metric and the third wakeword confidence metric.

According to some examples, method 400 may involve receiving first through $N^{th}$ wakeword confidence metrics from first through $N^{th}$ devices in an environment. The first through $N^{th}$ wakeword confidence metrics may correspond to first through $N^{th}$ local maxima of the wakeword confidence values determined by the first through $N^{th}$ devices. In some such examples, method 400 may involve comparing the first through $N^{th}$ wakeword confidence metrics and selecting a device for subsequent audio processing based, at least in part, on a comparison of the first through $N^{th}$ wakeword confidence metrics.

In some implementations, blocks 405 and 410 may involve receiving, by a third device configured for determining wakeword confidence values and determining a local maximum of the wakeword confidence values, the first wakeword confidence metric and the second wakeword confidence metric. In some such implementations, the third device may be configured to perform at least blocks 415 and 420 of method 400. In some implementations, the third device may be a local device. In some such implementations, all three devices may be, or may include, a wakeword detector. One or more of the devices may be, or may include, a virtual assistant. However, in other implementations, the third device may be a remote device, such as a server.

According to some examples, a local maximum may be determined subsequent to determining that a wakeword confidence value exceeds a wakeword detection start threshold, which may be a predetermined threshold. For example, referring again to FIG. 2, in some such examples a local maximum may be determined subsequent to determining that a wakeword confidence value exceeds the wakeword detection start threshold 215a. In some such examples, a local maximum may be determined by detecting a decrease in a wakeword confidence value after a previous wakeword confidence value has exceeded the wakeword detection start threshold.

In some such implementations, a local maximum may be determined by detecting, after a previous wakeword confidence value has exceeded the wakeword detection start threshold, a decrease in a wakeword confidence value of audio frame as compared to a wakeword confidence value of a previous audio frame, which in some instances may be the most recent audio frame or one of the most recent audio frames. For example, a local maximum may be determined by detecting, after a previous wakeword confidence value has exceeded the wakeword detection start threshold, a decrease in a wakeword confidence value of audio frame n as compared to a wakeword confidence value of audio frame n−k, wherein k is an integer.

According to some such implementations, some methods may involve initiating a local maximum determination time interval after a wakeword confidence value of the first device, the second device or another device exceeds, with a rising edge, the wakeword detection start threshold. Some such methods may involve terminating the local maximum determination time interval after a wakeword confidence value of the first device, the second device or another device falls below a wakeword detection end threshold.

For example, referring again to FIG. 2, in some such examples a local maximum determination time interval may be initiated at a start time A, when a wakeword confidence value corresponding to any device of a group of devices exceeds the wakeword detection start threshold 215a. In this example, the far device is the first to have a wakeword confidence value exceed the wakeword detection start threshold, the time A of which is when the curve 205c exceeds the wakeword detection start threshold 215a. According to this example, the threshold 215b is a wakeword detection end threshold. In this example, the wakeword detection end threshold 215b is less than (lower than) the wakeword detection start threshold 215a. In some alternative examples, the wakeword detection end threshold 215b may be equal to the wakeword detection start threshold 215a. In still other examples, the wakeword detection end threshold 215b may be greater than the wakeword detection start threshold 215a.

According to some examples, the local maximum determination time interval may terminate after a wakeword confidence value of all devices in a group falls below the wakeword detection end threshold 215b. For example, referring to FIG. 2, the local maximum determination time interval may equal K time units and may terminate at an end time A+K, when a wakeword confidence value of the near device falls below the wakeword detection end threshold 215b. By the end time A+K, the wakeword confidence values of the far device and the mid-distance device had already fallen below the wakeword detection end threshold 215b. According to some examples, the local maximum determination time interval may end either when a wakeword confidence value of all devices in a group falls below the wakeword detection end threshold 215b or after a maximum time interval has elapsed, whichever is reached first.

Figure 5:
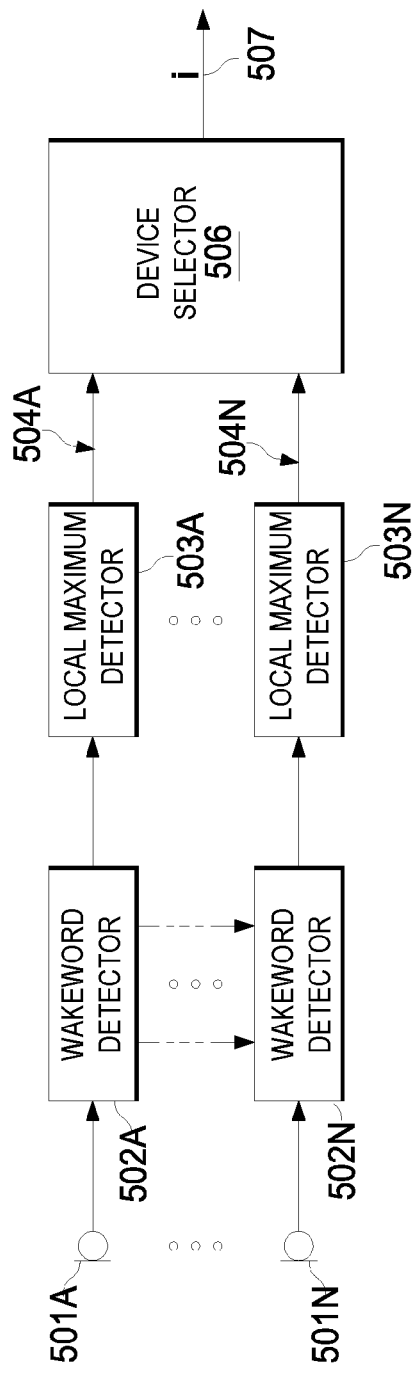
FIG. 5 is a block diagram that shows examples of elements (and processing steps implemented thereby) according to one disclosed embodiment.

FIG. 5 is a block diagram that shows examples of elements (and processing steps implemented thereby) according to one disclosed embodiment. In the example shown in FIG. 5, a plurality of microphones 501A-501N feed a corresponding plurality of wakeword detectors 502A-502N. According to some such implementations, each device includes at least one of the microphones 501, a corresponding wakeword detector 502 and a corresponding local maximum detector 503. For example, wakeword detectors 502A-502N may be implementations of wakeword detection subsystems of devices 103, 105, and 107 of FIG. 1B.

According to this example, a sequence of values of wakeword confidence is determined by each of the detectors 502A-502N, and each such sequence is fed into one of a plurality of local maximum detectors 503A-503N. In some such examples, each such value is $w_i(n)$, $i=\{1 \ldots M\}$, where M represents the number of wakeword detectors 502, i represents a detector index and n represents a frame index. At some time after a wakeword confidence (determined by one of detectors 502A-502N) exceeds a predefined wakeword detection start threshold, the wakeword confidence typically begins to fall. For example, one of the local maximum detectors 503A-503N may determine that $w_i(n) < w_i(n-k)$, where k represents a number of frames. In one such implementation, one of the local maximum detectors 503A-503N may determine that $w_i(n) < w_i(n-1)$. When the wakeword confidence begins to fall, in some implementations the local maximum confidence value $y_i$ up to this point in time may be recorded. In some implementations, $y_i=\max(w_i)$, $w_i=[w_i(n-N), w_i(n-N+1), \ldots, w(n)]^T$, where N represents the length of a relevant history buffer.

According to some such implementations, each such local maximum confidence value may be provided to an element of the system that implements a device selector. In the example that is shown in FIG. 5, each of the local maximum detectors 503A-503N provides a corresponding one of the local maximum confidence values 504A-504N to the device selector 506. According to some examples, the device selector 506 may be implemented by a local device that is implementing one of the wakeword detectors 502A-502N. In alternative implementations, the device selector 506 may be implemented by a local device that is not implementing one of the wakeword detectors 502A-502N, e.g. a laptop computer, a cell phone, etc. In some examples, the device selector 506 may be implemented by a remote device, such as a server of a cloud-based service provider.

According to some examples, after all of the devices have produced a maximum confidence, $y_i$, the index of the most confident device, $\text{argmax}(y_i)$, which is the greatest one of the maximum confidence values $y_i$, is chosen for subsequent speech capture. For example, if the wakeword detector nearest the user generates the maximum confidence value, $y_i$, the smart audio device in (or for) which this detector is implemented is caused to enter a state of attentiveness (and may assert an appropriate attentiveness indication to the user) in which it awaits a subsequent voice command, and then, in response to such a voice command, the device may perform at least one predetermined action.

Figure 6:
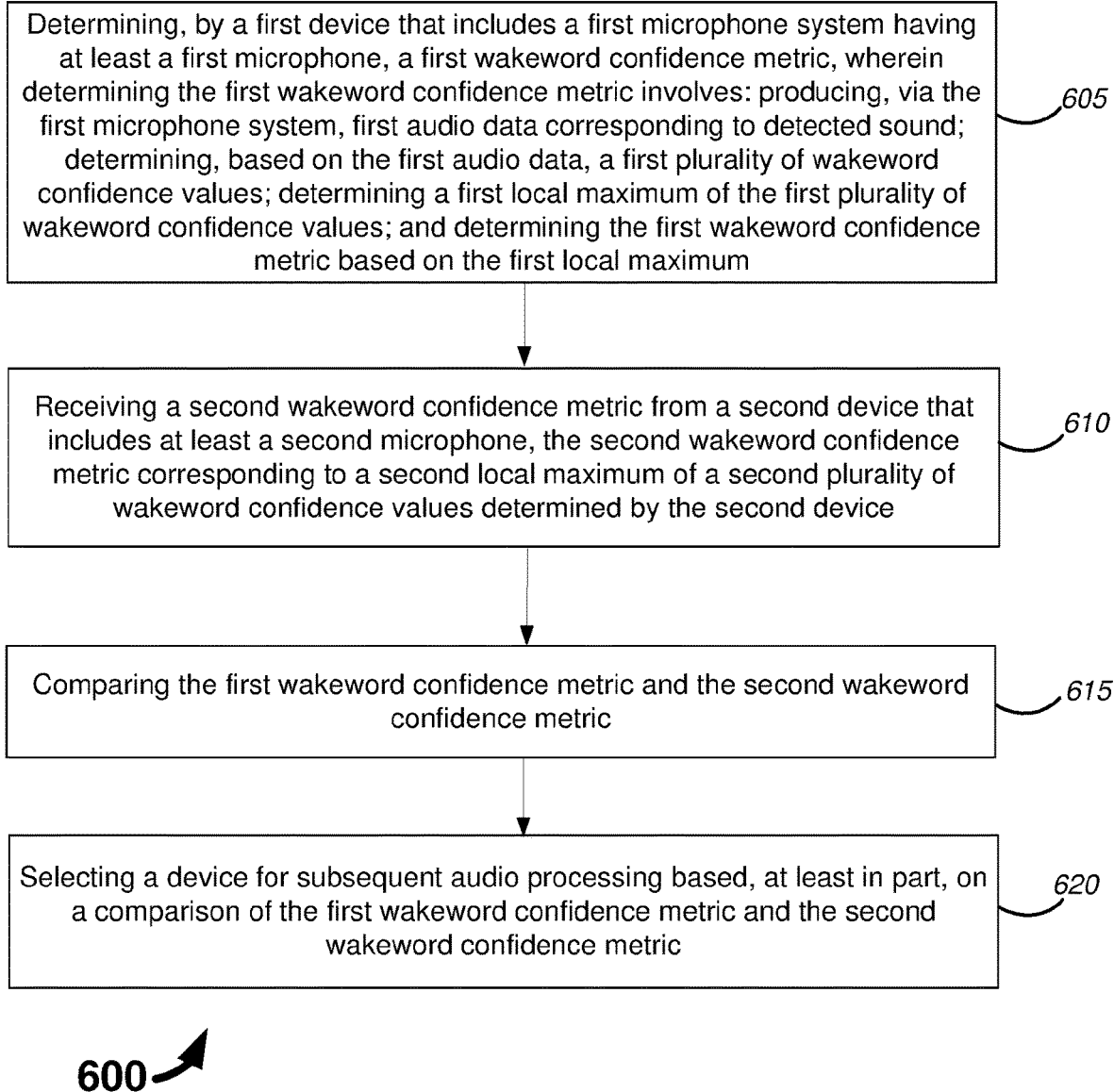
FIG. 6 is a flow diagram that outlines another example of a method that may be performed by an apparatus such as that shown in FIG. 3.

FIG. 6 is a flow diagram that outlines another example of a method that may be performed by an apparatus such as that shown in FIG. 3. The blocks of method 600, like other methods described herein, are not necessarily performed in the order indicated. Moreover, such methods may include more or fewer blocks than shown and/or described. In this implementation, method 600 involves selecting a device for audio processing. In this example, method 600 is performed by a device that is configured to determine a wakeword confidence metric corresponding to a local maximum of a plurality of wakeword confidence values. According to some examples, method 600 may be performed by a device that is configured to perform the audio processing. However, in some examples method 600 may be performed by a device that is not configured to perform the audio processing.

In this example, block 605 involves determining, by a first device that includes a first microphone system having at least a first microphone, a first wakeword confidence metric. In this example, determining the first wakeword confidence metric involves producing, via the first microphone system, first audio data corresponding to detected sound. According to this example, determining the first wakeword confidence metric involves determining, based on the first audio data, a first plurality of wakeword confidence values and determining a first local maximum of the first plurality of wakeword confidence values. In this implementation, determining the first wakeword confidence metric involves determining the first wakeword confidence metric based on the first local maximum. For example, determining the first wakeword confidence metric may involve making the first wakeword confidence metric equal to the first local maximum.

In this implementation, block 610 involves receiving a second wakeword confidence metric from a second device that includes at least a second microphone. According to this example, the second wakeword confidence metric corresponds to a second local maximum of a second plurality of wakeword confidence values determined by the second device. In this example, the first device and the second device are in the same environment, which may be an environment like that shown in FIG. 1A or FIG. 1B.

However, the first microphone and the second microphone may or may not be synchronous microphones, based on the particular implementation. According to some examples, a first microphone of a plurality of microphones within the environment may sample audio data according to a first sample clock and a second microphone of the plurality of microphones may sample audio data according to a second sample clock.

According to the example shown in FIG. 6, block 615 involves comparing the first wakeword confidence metric and the second wakeword confidence metric. In this example, block 620 involves selecting a device for subsequent audio processing based, at least in part, on a comparison of the first wakeword confidence metric and the second wakeword confidence metric. For example, block 620 may involve selecting the device that determined the higher wakeword confidence metric.

According to some implementations, the subsequent audio processing may be, or may include, a speech recognition process. For example, the subsequent audio processing may be, or may include, a command recognition process. In some instances, method 600 may involve controlling a selected device according to the command recognition process. For example, method 600 may involve controlling a virtual assistant according to the command recognition process. In some such examples, method 600 may involve controlling the virtual assistant to initiate a telephone call, controlling the virtual assistant to perform an Internet search, controlling the virtual assistant to provide instructions to another device, such as a television, a sound system controller or another device in the environment.

In some examples, method 600 may involve receiving wakeword confidence metrics from more than two devices in an environment. Some such examples may involve receiving a third wakeword confidence metric from a third device that includes at least a third microphone. The third wakeword confidence metric may correspond to a third local maximum of a third plurality of wakeword confidence values determined by the third device. In some such examples, method 600 may involve comparing the third wakeword confidence metric with the first wakeword confidence metric and the second wakeword confidence metric and selecting a device for subsequent audio processing based, at least in part, on a comparison of the first wakeword confidence metric, the second wakeword confidence metric and the third wakeword confidence metric.

According to some examples, method 600 may involve receiving first through $N^{th}$ wakeword confidence metrics from first through $N^{th}$ devices in an environment. The first through $N^{th}$ wakeword confidence metrics may correspond to first through $N^{th}$ local maxima of the wakeword confidence values determined by the first through $N^{th}$ devices. In some such examples, method 600 may involve comparing the first through $N^{th}$ wakeword confidence metrics and selecting a device for subsequent audio processing based, at least in part, on a comparison of the first through $N^{th}$ wakeword confidence metrics.

In some implementations, method 600 may involve receiving, by a third device configured for determining wakeword confidence values and determining a local maximum of the wakeword confidence values, the first wakeword confidence metric and the second wakeword confidence metric. In some such implementations, the third device may be configured to perform at least blocks 415 and 420 of method 400. In some implementations, the third device may be a local device. In some such implementations, all three devices may be, or may include, a wakeword detector. One or more of the devices may be, or may include, a virtual assistant. However, in other implementations, the third device may be a local device that does not include a wakeword detector and/or a device that is not configured to determine a wakeword confidence metric corresponding to a local maximum of a plurality of wakeword confidence values. According to some alternative implementations, the third device may be a remote device, such as a server.

According to some examples, a local maximum may be determined subsequent to determining that a wakeword confidence value exceeds a wakeword detection start threshold, which may be a predetermined threshold. For example, referring again to FIG. 2, in some such examples a local maximum may be determined subsequent to determining that a wakeword confidence value exceeds the wakeword detection start threshold 215a. In some such examples, a local maximum may be determined by detecting a decrease in a wakeword confidence value after a previous wakeword confidence value has exceeded the wakeword detection start threshold.

In some such implementations, a local maximum may be determined by detecting, after a previous wakeword confidence value has exceeded the wakeword detection start threshold, a decrease in a wakeword confidence value of audio frame as compared to a wakeword confidence value of a previous audio frame, which in some instances may be the most recent audio frame or one of the most recent audio frames. For example, a local maximum may be determined by detecting, after a previous wakeword confidence value has exceeded the wakeword detection start threshold, a decrease in a wakeword confidence value of audio frame n as compared to a wakeword confidence value of audio frame n−k, wherein k is an integer.

According to some such implementations, some methods may involve initiating a local maximum determination time interval after a wakeword confidence value of the first device, the second device or another device exceeds, with a rising edge, the wakeword detection start threshold. Some such methods may involve terminating the local maximum determination time interval after a wakeword confidence value of the first device, the second device or another device falls below a wakeword detection end threshold.

According to some such methods, the local maximum determination time interval may initiate at time A and may terminates at a time (A+K). Some such methods are described above with reference to FIG. 2. According to some examples, the time (A+K) may be a time at which wakeword confidence values of the first device and the second device fall below a wakeword detection end threshold. In some examples, the time (A+K) may be a time at which a wakeword confidence value of the first device, the second device or another device falls below a wakeword detection end threshold. In some examples, the wakeword detection end threshold may be less than or equal to the wakeword detection start threshold. Some implementations may involve terminating the local maximum determination time interval after a maximum value of K has been reached. Some such implementations may involve terminating the local maximum determination time interval after a maximum value of K has been reached, whether or not a wakeword confidence value of the first device, the second device or another device falls below a wakeword detection end threshold.

While specific embodiments and applications of the disclosure have been described herein, it will be apparent to those of ordinary skill in the art that many variations on the embodiments and applications described herein are possible without departing from the scope of this disclosure.

The invention claimed is:

1. A method of selecting a device for audio processing, the method comprising:
receiving a first wakeword confidence metric from a first device that includes at least a first microphone and that samples audio data received by the first microphone according to a first clock domain, the first wakeword confidence metric corresponding to a first local maximum of a first history of wakeword confidence values stored by the first device;
receiving a second wakeword confidence metric from a second device that includes at least a second microphone and that samples audio data received by the second microphone according to a second clock domain that is different than the first clock domain, the second wakeword confidence metric corresponding to a second local maximum of a second history of wakeword confidence values stored by the second device;
comparing the first wakeword confidence metric and the second wakeword confidence metric; and
selecting one of the first or second device for subsequent audio processing based, at least in part, on a comparison of the first wakeword confidence metric and the second wakeword confidence metric.

2. The method of claim 1, further comprising:
receiving a third wakeword confidence metric from a third device that includes at least a third microphone, the third wakeword confidence metric corresponding to a third local maximum of a third history of wakeword confidence values stored by the third device;
comparing the third wakeword confidence metric with the first wakeword confidence metric and the second wakeword confidence metric; and
selecting one of the first, second or third device for subsequent audio processing based, at least in part, on a comparison of the first wakeword confidence metric, the second wakeword confidence metric and the third wakeword confidence metric.

3. The method of claim 1, wherein the subsequent audio processing comprises a speech recognition process.

4. The method of claim 1, wherein the subsequent audio processing comprises a command recognition process.

5. The method of claim 4, further comprising controlling a selected device according to the command recognition process.

6. The method of claim 1, wherein a local maximum is determined subsequent to determining that a wakeword confidence value exceeds a wakeword detection start threshold.

7. The method of claim 6, wherein a local maximum is determined by detecting a decrease in a wakeword confidence value after a previous wakeword confidence value has exceeded the wakeword detection start threshold, or wherein a local maximum is determined by detecting, after a previous wakeword confidence value has exceeded the wakeword detection start threshold, a decrease in a wakeword confidence value of audio frame n as compared to a wakeword confidence value of audio frame n−k, wherein k is an integer.

8. The method of claim 6, further comprising initiating a local maximum determination time interval after a wakeword confidence value of the first device, the second device or another device exceeds, with a rising edge, the wakeword detection start threshold.

9. The method of claim 8, further comprising terminating the local maximum determination time interval after a wakeword confidence value of the first device, the second device or another device falls below a wakeword detection end threshold.

10. An apparatus configured to perform the method of claim 1.

11. One or more non-transitory media having software stored thereon, the software including instructions for controlling one or more devices to perform the method of claim 1.

12. A method of selecting a device for audio processing, the method comprising:
determining, by a first device that includes a first microphone system having at least a first microphone and that samples audio data received by the first microphone according to a first clock domain, a first wakeword confidence metric, wherein determining the first wakeword confidence metric involves:
  producing, via the first microphone system, first audio data corresponding to detected sound;
  storing, based on the first audio data, a first history of wakeword confidence values on the first device;
  determining a first local maximum of the first history of wakeword confidence values; and
  determining the first wakeword confidence metric based on the first local maximum;
receiving a second wakeword confidence metric from a second device that includes at least a second microphone and that samples the audio data received by the second microphone according to a second clock domain that is different than the first clock domain, the second wakeword confidence metric corresponding to a second local maximum of a second history of wakeword confidence values stored by the second device;
comparing the first wakeword confidence metric and the second wakeword confidence metric; and
selecting one of the first or second device for subsequent audio processing based, at least in part, on a comparison of the first wakeword confidence metric and the second wakeword confidence metric.

13. The method of claim 12, wherein a local maximum is determined subsequent to determining that a wakeword confidence value exceeds a wakeword detection start threshold, or wherein a local maximum is determined by detecting a decrease in a wakeword confidence value after a previous wakeword confidence value has exceeded the wakeword detection start threshold.

14. The method of claim 12, wherein a local maximum is determined by detecting, after a previous wakeword confidence value has exceeded the wakeword detection start threshold, a decrease in a wakeword confidence value of audio frame n as compared to a wakeword confidence value of audio frame n−k, wherein k is an integer.

15. The method of claim 14, further comprising initiating a local maximum determination time interval after a wakeword confidence value of the first device, the second device or another device exceeds, with a rising edge, the wakeword detection start threshold.

16. The method of claim 15, wherein the local maximum determination time interval initiates at time A and terminates at a time (A+K), a time at which wakeword confidence values of the first device and the second device fall below a wakeword detection end threshold.

17. The method of claim 15, wherein the local maximum determination time interval initiates at time A and terminates at a time (A+K), a time at which a wakeword confidence value of the first device, the second device or another device falls below a wakeword detection end threshold.

18. An apparatus configured to perform the method of claim 12.

19. One or more non-transitory media having software stored thereon, the software including instructions for controlling one or more devices to perform the method of claim 12.

* * * * *